US007126529B1

(12) United States Patent
Voor et al.

(10) Patent No.: US 7,126,529 B1
(45) Date of Patent: Oct. 24, 2006

(54) METHOD AND SYSTEM FOR SELECTIVE CONTROL OF CHARGING A POWER SOURCE

(75) Inventors: Thomas E. Voor, Parkland, FL (US); Brian E. Brucknor, Miramar, FL (US); Sameh W. Tawadrous, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 41 days.

(21) Appl. No.: 11/111,427

(22) Filed: Apr. 21, 2005

(51) Int. Cl.
*H04B 7/185* (2006.01)
(52) U.S. Cl. ............................................. 342/357.06
(58) Field of Classification Search ........... 342/357.01, 342/357.06, 357.13, 357.14; 701/213, 215
See application file for complete search history.

(56) References Cited

U.S. PATENT DOCUMENTS

| | | | | |
|---|---|---|---|---|
| 5,694,335 A * | 12/1997 | Hollenberg | ................. | 713/201 |
| 5,778,326 A * | 7/1998 | Moroto et al. | ................. | 701/22 |
| 6,370,451 B1 * | 4/2002 | Lutz | ............................. | 701/22 |
| 6,674,362 B1 * | 1/2004 | Yoshioka et al. | ........... | 340/506 |
| 6,774,604 B1 * | 8/2004 | Matsuda et al. | ............. | 320/110 |
| 2004/0019812 A1 * | 1/2004 | Chen et al. | ................. | 713/300 |
| 2004/0210356 A1 * | 10/2004 | Wilton et al. | ................. | 701/22 |
| 2005/0005814 A1 * | 1/2005 | Kumar et al. | ................. | 105/35 |
| 2005/0178632 A1 * | 8/2005 | Ross | ............................ | 191/10 |

\* cited by examiner

*Primary Examiner*—Dao Phan
(74) *Attorney, Agent, or Firm*—Larry G. Brown

(57) ABSTRACT

The invention concerns a method (200) and system (100) for selective control of charging a power source (122). The method can include the steps of charging (212) the power source of an electronic device (136) in which the electronic device also includes a global positioning system unit (118) and conducting (216) a session for the global positioning system unit. The method can also include the step of—in response to the session—selectively throttling (218) the flow of current to the power source of the electronic device to reduce the effect of thermal variation on the operation of the global positioning system unit.

21 Claims, 3 Drawing Sheets

METHOD AND SYSTEM FOR SELECTIVE CONTROL OF CHARGING A POWER SOURCE

BACKGROUND OF THE INVENTION

1. Field of the Invention

This invention relates in general to charging techniques for electronic devices and more particularly, to selectively controlling a power source for electronic devices.

2. Description of the Related Art

The use of portable devices, particularly mobile communications units, has exploded recently. Manufacturers are constantly adding features to these devices to make them more desirable to consumers. In addition, government agencies may order manufacturers to implement certain features in their devices. As an example, in part because of consumer demand and in part because of a government mandate, cellular telephone manufacturers have built Global Positioning System (GPS) receivers in their products. A GPS receiver can enable a cellular telephone to determine its physical location, which can be displayed to a user of the device or forwarded to some other entity, like an emergency operator.

GPS receivers typically include a reference oscillator circuit for purposes of synchronization. In particular, when a GPS receiver attempts to determine its location, the GPS receiver will establish communications with the appropriate satellites, relying on the reference oscillator circuit to do so. There is a possibility that the frequency of the reference oscillator circuit will drift, which may prolong the time that it takes for the GPS receiver to determine its location from the satellites. As an example, if the temperature of the reference oscillator circuit varies, the frequency of the reference oscillator circuit will vary, too. To help solve the problem of frequency drift, temperature-compensated oscillators (TCXO) have been developed, which can adjust the reference frequency in view of a temperature variation.

There are several ways in which the reference oscillator circuit may be subjected to heat. For example, almost all cellular telephones include charging circuits, which can be used to replenish rechargeable batteries. As the cellular telephone is charged, heat can be introduced into the device, which may cause frequency drift in the reference oscillator circuit of the GPS receiver. This variation in temperature even affects the performance of TCXOs.

SUMMARY OF THE INVENTION

The present invention concerns a method for selective control of charging a power source. The method can include the steps of charging a power source of an electronic device having a GPS unit and conducting a session for the GPS unit. In response, the method can also include the step of selectively throttling the flow of current to the power source of the electronic device to reduce the effect of thermal variation on the operation of the GPS unit.

As an example, the step of conducting a session for the GPS unit can include conducting an acquisition session in which the GPS unit acquires and synchronizes with a plurality of GPS satellites. The method can also include the step of monitoring at least one of the temperature of the GPS unit, the voltage on the power source and the amount of current flowing into the electronic device.

In one arrangement, during a first phase based on a first predetermined parameter, the selectively throttling the flow of current step can include at least substantially preventing the current from flowing to the power source. Also during the first phase, the selectively throttling the flow of current step can include permitting enough of the current to flow to the GPS unit to allow the GPS unit to operate. As an example, the first predetermined parameter can be at least one of a predetermined amount of time and a predetermined rate of temperature change.

In another arrangement, a second phase can last from the end of a first phase to the point at which the GPS unit reaches a predetermined thermal equilibrium. During the second phase, the selectively throttling the flow of current step can include varying the amount of current flowing to the power source to reduce the rate of temperature change at the GPS unit.

A third phase can last from the point at which the GPS unit reaches a predetermined thermal equilibrium to the point at which the power source reaches a predetermined charging voltage. During the third phase, the selectively throttling the flow of current step can include maintaining the flow of current at a substantially constant value to reduce the rate of temperature change at the GPS unit.

In yet another arrangement, a fourth phase can last from the point at which the power source reaches a predetermined charging voltage until the charging process is complete. During the fourth phase, the selectively throttling the flow of current step can include at least one of maintaining the current flow at its conventional level and diverting at least a portion of the flow of current to another component in the electronic device. As an example, the electronic device can be a mobile communications unit.

The present invention also concerns a system for selective control of charging a power source. The system can include a power source, a charging circuit that can be coupled to and can enable the charging of the power source and a GPS unit. The GPS unit can determine a physical location of the system. The system can also include a processor, which can be coupled to the charging circuit and the GPS unit. The processor can be programmed to—in response to an initiation of a session for the GPS unit and during the charging of the power source—selectively throttle the flow of current to the power source to reduce the effect of thermal variation on the operation of the GPS unit. The system can also include suitable software and circuitry for performing the processes described above.

The present invention also concerns a portable electronic device. The device can include a power source, a charging circuit that can be coupled to and can enable the charging of the power source and a GPS unit. The GPS unit can determine a physical location of the device. The device can also include a user interface section having a display and an input/output component and can include a processor coupled to the charging circuit, the GPS unit and the user interface section. The processor can be programmed to—in response to a session being conducted for the GPS unit and during the charging of the power source—selectively throttle the flow of current to the power source to reduce the effect of thermal variation on the operation of the GPS unit. The device can also include suitable software and circuitry for performing the processes described above.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

Figure 1:
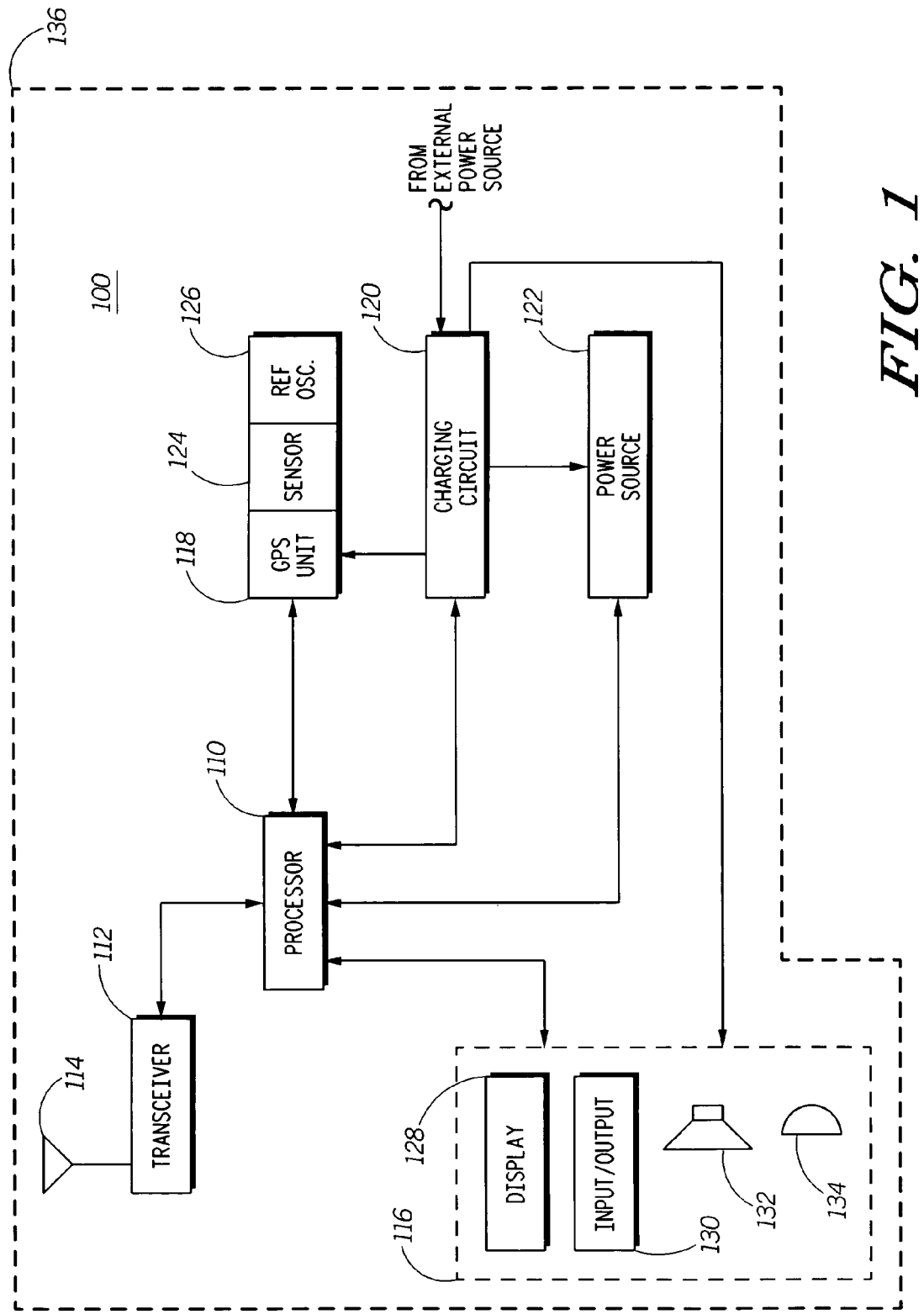
FIG. 1 illustrates a system for selective control of charging of a power source in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The invention concerns a method and system for selective control of charging a power source. The method can include the steps of charging a power source of an electronic device in which the electronic device also includes a GPS unit and conducting a session for the GPS unit. The method can also include the step of—in response to the session—selectively throttling the flow of current to the power source of the electronic device. This process can reduce the effect of thermal variation on the operation of the GPS unit. Several examples of how the flow of current can be selectively throttled will be presented below.

Referring to FIG. 1, a system 100 for selective control of charging of a power source is shown. The system 100 can include a processor 110, a transceiver 112, an antenna 114 (which can be coupled to the transceiver 112), a user interface section 116, a GPS unit 118, a charging circuit 120 and a power source 122. The processor 110 can be communicatively coupled to the transceiver 112, the user interface section 116, the GPS unit 118, the charging circuit 120 and the power source 122. Also, the processor 110 can control the operation of one of more of these components. In one arrangement, the user interface section 116 can include a display 128, an input/output component 130, a speaker 132 and a microphone 134. In another arrangement, the GPS unit 118 can include a sensor 124 and a reference oscillator 126.

The system 100 can be implemented in an electronic device 136, such as a mobile communications unit. Suitable examples include cellular telephones, two-way radios, personal digital assistants, paging devices, etc. Of course, the invention is not limited to any of these examples, as the electronic device 136 can be any device having a unit that can determine the physical location of the device 136.

The transceiver 112, along with the antenna 114, can transmit and receive wireless signals in accordance with well-known principles. In addition, the display 128 of the user interface section 116 can display images to a user of the electronic device 136 and can also receive input from the user. The speaker 132 can broadcast audio, and the microphone 134 can capture audio. Further, the input/output component 130 can be any unit capable of receiving input from or outputting output to a user of the electronic device 136. Suitable examples include a keypad or any wireless or wired interface capable of receiving and outputting signals.

The GPS unit 118, as is known in the art, can acquire signals from any number of GPS satellites (not shown) and can synchronize with these satellites. As is also known in the art, the reference oscillator 126 can assist in this acquisition and synchronization process or session. In one arrangement, the sensor 124 can be a temperature sensor that can measure the temperature of or around the GPS unit 118. It is understood that the term global positioning system unit can include any component that is capable of determining the location of the electronic device 136 and is not necessarily limited to one that relies on a satellite-based system.

The charging circuit 120 can receive charging current from, for example, an external power source (not shown) and can transfer this current to any suitable component of the electronic device 136. As an example, the charging circuit 120—through the receipt of signals from the processor 110—can control the flow of current to the power source 122 and the GPS unit 118. The charging circuit 120 may also be coupled to, for example, the user interface section 116. As will be described below, the charging circuit 120 may also divert charging current to one or more components of the user interface section 116. The power source 122 can supply power to any suitable components of the system 100. As an example but without limitation, the power source 122 can be one or more rechargeable batteries.

Figure 2:
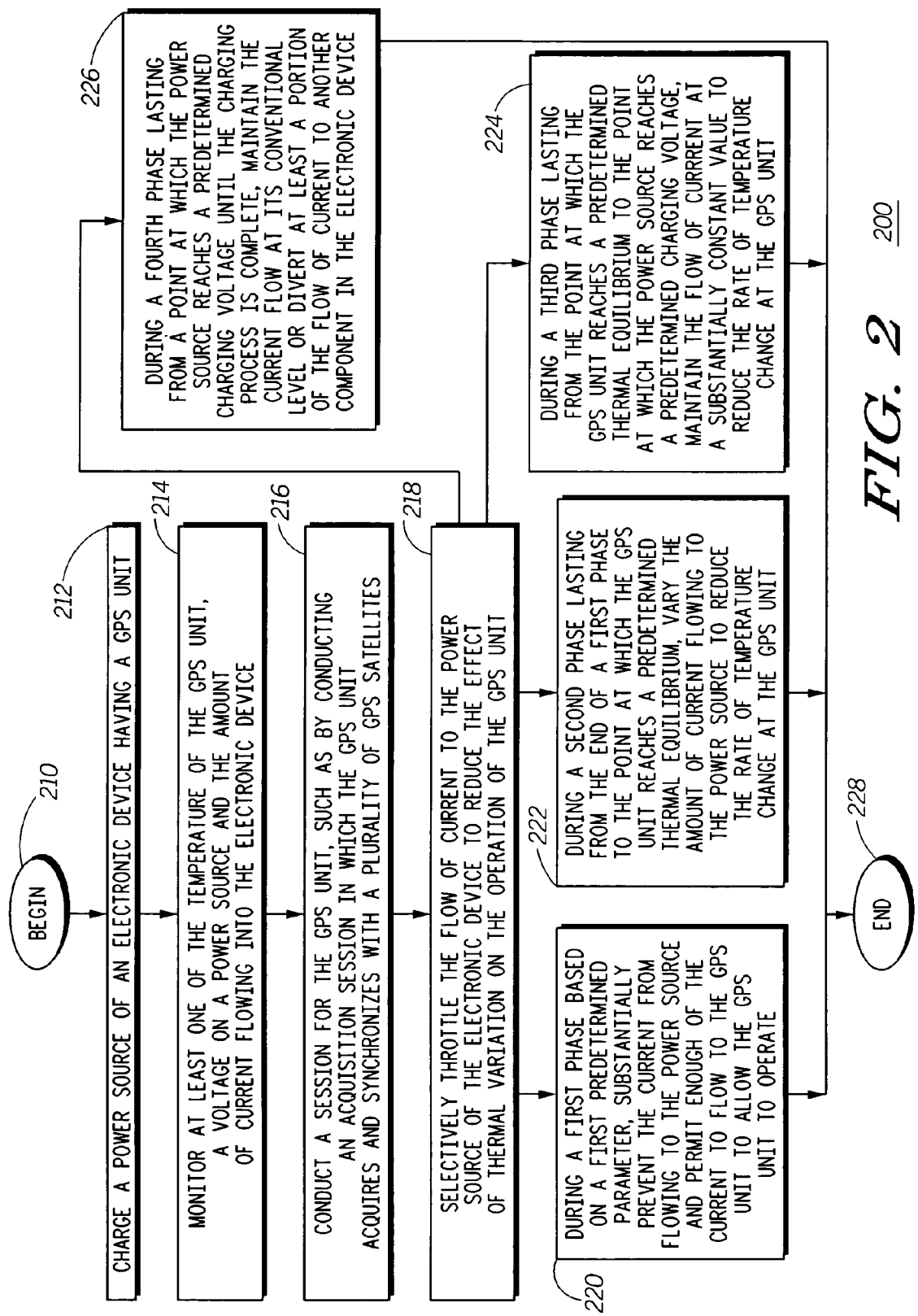
FIG. 2 illustrates a method for selective control of charging a power source in accordance with an embodiment of the inventive arrangements.

Referring to FIG. 2, a method 200 for selective control of charging a power source is shown. To describe the method 200, reference will be made to FIG. 1, although it is understood that the method 200 can be implemented in any other suitable device or system using other suitable components. Moreover, the invention is not limited to the order in which the steps are listed in the method 200. In addition, the method 200 can contain a greater or a fewer number of steps than those shown in FIG. 2.

At step 210, the method 200 can begin. At step 212, a power source of an electronic device having a GPS unit can be charged. At step 214, at least one of the temperature of the GPS unit, the voltage on a power source and the amount of current flowing into the electronic device can be monitored. A session can be conducted for the GPS unit, such as by conducting an acquisition session in which the GPS unit acquires and synchronizes with a plurality of GPS satellites, as shown at step 216.

Referring to FIG. 1, the power source 122 of the electronic device 136 can be charged. That is, charging current from an external power supply can pass to the charging circuit 120, which can direct the current to the power source 122. Also, the processor 110, through the charging circuit 120, can monitor the amount of current flowing into the electronic device 136 and can also monitor the voltage on the power source 122. The temperature sensor 124 can measure the temperature of the GPS unit 118, and these readings can be transmitted to the processor 110. Through these measurements, the processor 110 can track temperature variations at the GPS unit 118.

When it is necessary to obtain positional information, the processor 110 can signal the GPS unit 118 to do so. There are many reasons why it may be necessary to determine the location of the electronic device 136. For example, a user, through the input/output component 130, may dial an emergency number, such as 911, or may request directions to an address. As is known in the art, when so requested, the GPS unit 118 may acquire and synchronize with a plurality of GPS satellites or some other system that can enable the GPS unit 118 to determine the location of the electronic device 136. Referring back to the method 200 of FIG. 2, although the step 216 of conducting the acquisition session is shown as being after the step 212 of charging the power source, it is understood that the invention is not so limited; the acquisition session can be initiated before, after or simultaneous with a charging process.

It is understood that the phrase "conducting a session" can include any process that enables a GPS unit to determine the physical location of an electronic device. In particular, this phrase can cover repeatedly executing suitable steps to obtain the physical location, such as repeating acquisition and synchronization steps, and the constant tracking of an external source that the GPS unit acquires and to which it synchronizes.

At step 218, the flow of current to the power source of the electronic device can be selectively throttled to reduce the effect of thermal variation on the operation of the GPS unit. There are several examples of this process, each of which will be presented below. For example, at step 220, during a first phase based on a first predetermined parameter, the current can be substantially prevented from flowing to the power source. Additionally, enough of the current can be permitted to flow to the GPS unit to permit the GPS unit to operate.

As another example, during a second phase lasting from the end of the first phase to the point at which the GPS unit reaches a thermal equilibrium, the amount of current flowing to the power source can be varied, as shown at step 222. This process can reduce the rate of temperature change at the GPS unit. In yet another example, at step 224, during a third phase, lasting from the point at which the GPS unit reaches a predetermined thermal equilibrium to the point at which the power source reaches a predetermined charging voltage, the flow of current to the power source can be maintained at a substantially constant value. This process can also reduce the rate of temperature change at the GPS unit. At step 226 and in yet another example, during a fourth phase lasting from a point at which the power source reaches a predetermined charging voltage until the charging process is complete, the current flow can be maintained at its conventional level. Alternatively, at least a portion of the flow of current can be diverted to another component in the electronic device. At step 228, the method 200 can end.

Figure 3:
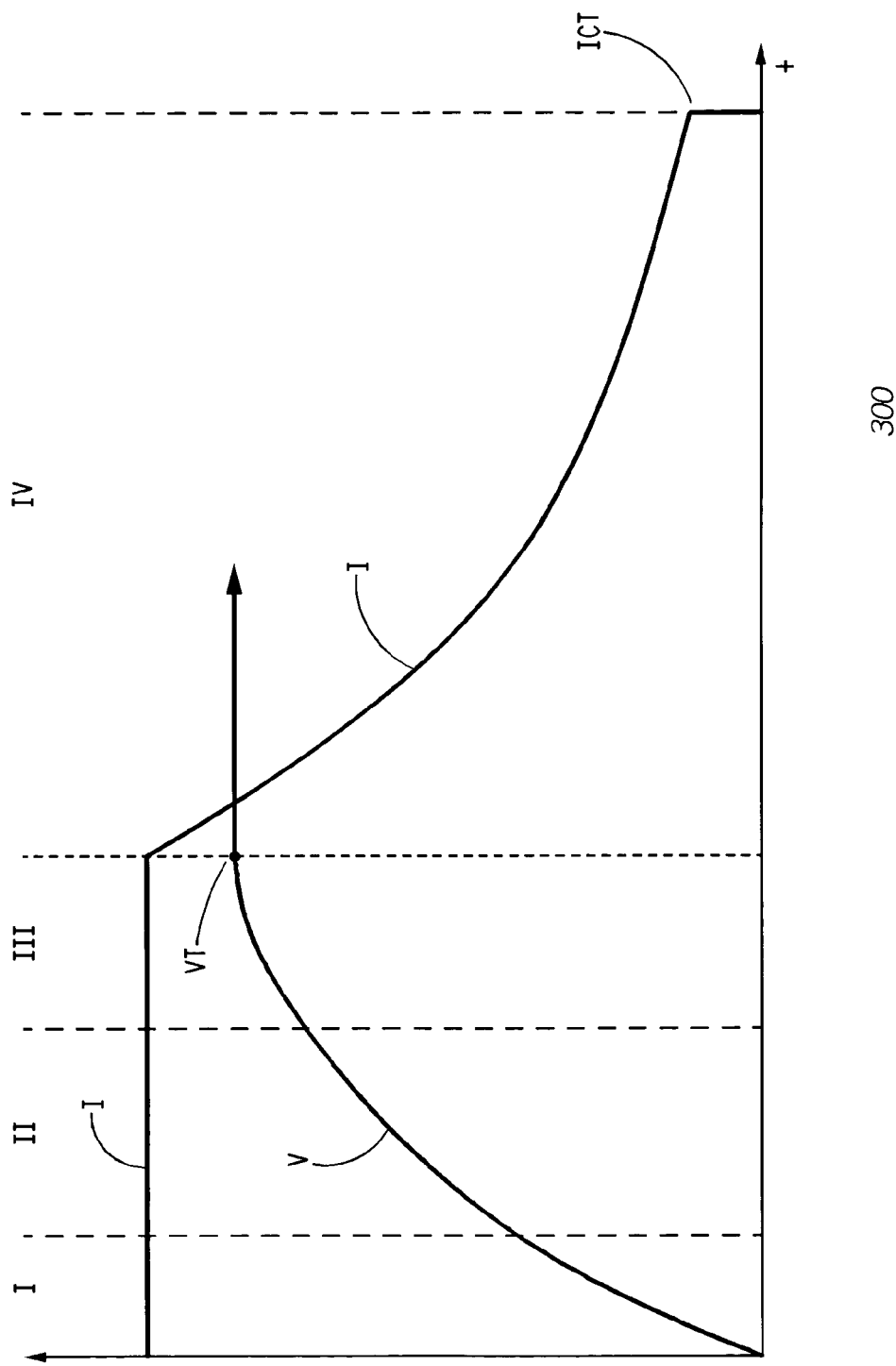
FIG. 3 illustrates a current-voltage graph in accordance with an embodiment of the inventive arrangements.

Referring to FIG. 3, an example of a current-voltage graph 300 that represents a typical charging process for the power source 122, e.g., a rechargeable battery, is shown. Referring to FIGS. 1 and 3, the graph 300 has a voltage curve V that represents the voltage of the power source 122 over time t. The graph 300 also includes a current curve I that signifies the amount of current flowing to the power source 122 over time t. The voltage curve V has a predetermined charging voltage $V_T$, which can represent a maximum charging voltage of the power source 122. The current curve can have a cutoff threshold $I_{CT}$, which is the point at which the charging of the power source 122 can stop. The graph 300 can also have four phases, each of which are designated by a Roman numeral. These phases I–IV can reflect various stages at which selective control of the charging of the power source 122 may occur.

In the first phase (phase I), the current curve I can be at a maximum charging current value, and the voltage curve V can increase. The rate of temperature change can be relatively high in this phase, too, as this first phase typically occurs when the process of charging the power source 122 begins. If a session is conducted for the GPS unit 118 during the first phase, then the processor 110 can signal the charging circuit 120 to substantially prevent the current from flowing to the power source 122. As an option, the processor 110 can also signal the charging circuit 120 to permit enough current to flow to the GPS unit 118 to allow the GPS unit 118 to operate.

For example, the maximum charging current value, the amount of charging current entering the electronic device 136, may be 850 milli-amps (mA). Almost all of this current may be directed to the power source 122. When the session for the GPS unit 118 is detected, the charging circuit 120 can reduce the amount of current being transferred to the power source 122 to substantially zero (substantially zero can include true zero or slight or even moderate deviations from zero). By cutting off the flow of current to the power source 122, the likelihood that a temperature variation will affect the operation of the GPS unit 118 can be reduced. Once the session for the GPS unit 118 is complete, the processor 110 can signal the charging circuit 120 to resume the normal course of charging. In this case, the charging current being directed to the power source 122 can return to its maximum charging value, or roughly 850 mA.

It should be noted that suitable amounts of current may be permitted to flow to the power source 122 in this first phase, if so desired. For example, if the GPS unit 118 is constantly tracking the external source that it has acquired and to which it is synchronized, a suitable amount of current can be permitted to reach the power source 122. This scenario is possible because the constant tracking of the external source can allow for a greater frequency drift and, hence, a greater temperature variation at the GPS unit 118. The amount of current permitted to pass to the power source 122 in this example can still fall within the definition of substantially prevent, as described above.

If the flow of current to the power source 122 is substantially prevented as described above, it may be desirable to divert some of this charging current to the GPS unit 118. In particular, the GPS unit 118 normally receives power from the power source 118. It the power source 118 has been depleted and charging current is being prevented from flowing to the power source 122, the charging circuit 120 may allow some of the charging current to reach the GPS unit 118. This amount of current can be enough to enable the GPS unit 118 to complete its task of acquiring positional information for the electronic device 136.

As noted earlier, the first phase can be based on a predetermined parameter. Specifically, the duration of the first phase can be based on a predetermined amount of time or on a predetermined rate of temperature change. For example, after a predetermined amount of time, the processor 110 can instruct the charging circuit 120 to control the flow of charging current in accordance with a manner that is suitable for the second phase (phase II), which will be described below.

Alternatively, the processor 110 can monitor the temperature variations present at the GPS unit 118. As an example, the processor 110 can monitor the rise in temperature that may occur at the GPS unit 118 during the charging process. If the rate of temperature change remains above a predetermined threshold, the processor 110 can determine that the flow of current to the power source 122 can be controlled in accordance with the procedures associated with the first phase. It is understood, however, that the invention is not limited to these examples, as any other suitable parameter can be used to determine the duration of the first phase.

In the second phase, the current curve I can be at a maximum charging current value, and the voltage curve V can continue to increase. Here, the rate of temperature change may not be as great as in the first phase. As such, the processor 110 can signal the charging circuit 120 to vary the amount of charging current flowing to the power source 122 to reduce the effect of thermal variation at the GPS unit 118, if a session for the GPS unit 118 is conducted.

For example, if the processor 110 detects, through the temperature sensor 124, that the rate of temperature change at the GPS unit 118 may affect the operation of the GPS unit 118, the processor 110 can signal the charging circuit 120 to reduce the amount of current flowing to the power source 122. The drop in current can cause a corresponding decrease in the rate of temperature change. If necessary, the processor 110 may also signal the charging circuit 120 to return the magnitude of the current to its previous level or some other suitable value. In either arrangement, the key is to minimize the amount of temperature variation at the GPS unit 118 when a session for the GPS unit 118 is conducted. Once the session is complete, the processor 110 can signal the charging circuit 120. In response, the charging circuit 120 can permit the level of charging current being transferred to the power source 122 to return to its pre-session magnitude, if necessary.

The duration of the second phase can last from the end of the first phase to the point at which the GPS unit 118 reaches a predetermined thermal equilibrium. The processor 110 can determine when the GPS unit 118 reaches the thermal equilibrium. Any suitable range of temperature can serve as the predetermined thermal equilibrium.

In the third phase (phase III), similar to the second phase, the current curve I can remain at a maximum charging current value, and the voltage curve V can continue to increase. Here, however, the GPS unit 118 can be at a thermal equilibrium. As such, if a session is conducted for the GPS unit 118, the processor 110 may signal the charging circuit 120 to maintain the flow of current to the power source 122 at a substantially constant value during the third phase. By doing so, the rate of temperature change can also be kept substantially constant, which can reduce the thermal effects on the operation of the GPS unit 118. Of course, once the session for the GPS unit 118 is over, the charging current to the power source 122 can remain unchanged.

In one embodiment, the third phase can last from the point at which the GPS unit 118 reaches a thermal equilibrium to the point at which the power source 122 reaches a predetermined charging voltage $V_T$. In one arrangement, the predetermined charging voltage $V_T$ can be the maximum charging voltage of the power source 122, although other suitable values are within contemplation of the inventive arrangements.

In the fourth phase (phase IV), the voltage curve V can reach the predetermined charging voltage $V_T$ and can remain at that level until the charging process is complete. The current curve I can gradually decrease, as the level of current required to maintain the power source 122 at the predetermined charging voltage $V_T$ decreases. During the fourth phase, if the processor 110 detects that a session is being conducted for the GPS unit 118, the processor 110 can signal the charging circuit 120 to perform one of two actions: (1) to maintain the current flow to the power source 122 at its conventional level; or (2) divert at least a portion of the flow of current to another component in the electronic device 136.

In particular, as the current curve I gradually decreases, the rate of change in the temperature of the GPS unit 118 may be relatively small. In fact, it may be small enough to have a negligible effect on the operation of the GPS unit 118 during a session. As such, the charging circuit 120 can keep the charging current level at the magnitude that it would normally follow if no session for the GPS unit 118 were conducted.

Alternatively, the processor 110 may determine that the change in temperature may affect the operation of the GPS unit 118 beyond an acceptable level. If so, the processor 110 can signal the charging circuit 120 to divert some current to, for example, one or more components of the user interface section 116, such as the display 128. As a result, the current curve I may not decrease as quickly as it normally would, may level off or may begin to rise. In any event, the rate of temperature change at the GPS unit 118 can be reduced, which may result in improved performance for the GPS unit 118.

Once the session for the GPS unit 118 is complete, the processor 110 can instruct the charging circuit 120 to return the level of current to the power source 122 to its pre-session magnitude. In one arrangement, the fourth phase can last from the point at which the power source 122 reaches the predetermined charging voltage $V_T$ until the charging process is complete. As an example, the charging process can be complete when the current curve I reaches the cutoff threshold $I_{CT}$.

Although several examples have been presented that demonstrate how current to a power source can be selectively throttled during a GPS session, it is important to note that the invention is not limited to them. In fact, any suitable technique for selectively throttling current during a GPS session can be employed, as long as the selected technique has the capability of reducing thermal effects on the operation of the GPS unit.

In addition, where applicable, the present invention can be realized in hardware, software or a combination of hardware and software. Any kind of computer system or other apparatus adapted for carrying out the methods described herein are suitable. A typical combination of hardware and software can be a mobile communication device with a computer program that, when being loaded and executed, can control the mobile communication device such that it carries out the methods described herein. The present invention can also be embedded in a computer program product, which comprises all the features enabling the implementation of the methods described herein and which when loaded in a computer system, is able to carry out these methods.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for selective control of charging a power source, comprising:
   charging a power source of an electronic device, wherein the electronic device also includes a global positioning system unit;
   monitoring the temperature of the global positioning system unit;
   conducting a session for the global positioning system unit; and
   in response, selectively throttling the flow of current to the power source of the electronic device to reduce the effect of thermal variation on the operation of the global positioning system unit.

2. The method according to claim 1, wherein conducting a session for the global positioning system unit includes conducting an acquisition session in which the global positioning system unit acquires and synchronizes with a plurality of global positioning system satellites.

3. The method according to claim 1, further comprising monitoring the voltage on the power source or the amount of current flowing into the electronic device.

4. The method according to claim 1, wherein during a first phase based on a first predetermined parameter, selectively throttling the flow of current includes at least substantially preventing the current from flowing to the power source.

5. The method according to claim 4, wherein selectively throttling the flow of current further comprises permitting enough of the current to flow to the global positioning system unit to allow the global positioning system unit to operate.

6. The method according to claim 4, wherein the first predetermined parameter is a predetermined amount of time or a predetermined rate of temperature change.

7. The method according to claim 1, wherein during a second phase lasting from the end of a first phase to the point at which the global positioning system unit reaches a predetermined thermal equilibrium, selectively throttling the flow of current includes varying the amount of current flowing to the power source to reduce the rate of temperature change at the global positioning system unit.

8. The method according to claim 1, wherein during a third phase lasting from the point at which the global positioning system unit reaches a predetermined thermal equilibrium to the point at which the power source reaches a predetermined charging voltage, selectively throttling the flow of current includes maintaining the flow of current at a substantially constant value to reduce the rate of temperature change at the global positioning system unit.

9. The method according to claim 1, wherein during a fourth phase lasting from the point at which the power source reaches a predetermined charging voltage until the charging process is complete, selectively throttling the flow of current includes:
   maintaining the current flow at its conventional level; or
   diverting at least a portion of the flow of current to another component in the electronic device.

10. The method according to claim 1, wherein the electronic device is a mobile communications unit.

11. A system for selective control of charging a power source, comprising:
    a power source;
    a charging circuit, wherein the charging circuit is coupled to and enables the charging of the power source;
    a global positioning system unit, wherein the global positioning system unit determines a physical location of the system; and
    a processor coupled to the charging circuit and the global positioning system unit, wherein the processor is programmed to monitor the temperature of the global positioning system unit and—in response to the conducting of a session for the global positioning system unit and during the charging of the power source—selectively throttle the flow of current to the power source to reduce the effect of thermal variation on the operation of the global positioning system unit.

12. The system according to claim 11, wherein the global positioning system unit determines the physical location of the system by acquiring and synchronizing with a plurality of global positioning system satellites.

13. The system according to claim 11, wherein the processor is further programmed to monitor the voltage on the power source or the amount of current flowing into the system.

14. The system according to claim 11, wherein during a first phase based on a predetermined parameter, the processor is further programmed to signal the charging circuit to selectively throttle the flow of current by at least substantially preventing the current from flowing to the power source.

15. The system according to claim 14, wherein the processor is further programmed to signal the charging circuit to permit enough of the current to flow to the global positioning system unit to allow the global positioning system unit to operate.

16. The system according to claim 14, wherein the first predetermined parameter is a predetermined amount of time or a predetermined rate of temperature change.

17. The system according to claim 11, wherein during a second phase lasting from the end of a first phase to the point at which the global positioning system unit reaches a predetermined thermal equilibrium, the processor is further programmed to signal the charging circuit to selectively throttle the flow of current by varying the amount of current flowing to the power source to reduce the rate of temperature change at the global positioning system unit.

18. The system according to claim 11, wherein during a third phase lasting from the point at which the global positioning system unit reaches a predetermined thermal equilibrium to the point at which the power source reaches a predetermined charging voltage, the processor is further programmed to signal the charging circuit to selectively throttle the flow of current by maintaining the flow of current at a substantially constant value to reduce the rate of temperature change at the global positioning system unit.

19. The system according to claim 11, wherein during a fourth phase lasting from the point at which the power source reaches a predetermined charging voltage until the charging process is complete, the processor is further programmed to signal the charging circuit to selectively throttle the flow of current by:
    maintaining the current flow at its conventional level; or
    diverting at least a portion of the flow of current to another component in the electronic device.

20. The system according to claim 11, wherein the power source, charging circuit, global positioning system unit and processor are part of a mobile communications unit.

21. A portable electronic device, comprising:
- a power source;
- a charging circuit, wherein the charging circuit is coupled to and enables the charging of the power source;
- a global positioning system unit, wherein the global positioning system unit determines a physical location of the device;
- a user interface section having a display and an input/output component; and
- a processor coupled to the charging circuit, the global positioning system unit and the user interface section, wherein the processor is programmed to monitor the temperature of the global positioning system unit and—in response to the conducting of a session for the global positioning system unit and during the charging of the power source—selectively throttle the flow of current to the power source to reduce the effect of thermal variation on the operation of the global positioning system unit.

\* \* \* \* \*